(12) United States Patent
Tomiyama et al.

(10) Patent No.: US 12,248,266 B2
(45) Date of Patent: *Mar. 11, 2025

(54) CONDUCTIVE SHEET AND SHEET BUNDLE PACKAGE

(71) Applicant: TOSHIBA TEC KABUSHIKI KAISHA, Tokyo (JP)

(72) Inventors: Takashi Tomiyama, Sunto Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,281

(22) Filed: Sep. 18, 2023

(65) Prior Publication Data

US 2024/0004336 A1  Jan. 4, 2024

Related U.S. Application Data

(63) Continuation of application No. 17/888,707, filed on Aug. 16, 2022, now Pat. No. 11,796,950.

(30) Foreign Application Priority Data

Nov. 1, 2021 (JP) ................................ 2021-178653

(51) Int. Cl.
*G03G 15/00* (2006.01)
*H04N 1/32* (2006.01)

(52) U.S. Cl.
CPC ..... *G03G 15/5062* (2013.01); *H04N 1/32138* (2013.01)

(58) Field of Classification Search
CPC ........... G03G 15/5062; G03G 15/5066; G03G 15/507; G06K 7/10297; G06K 19/0723; H04N 1/32138

See application file for complete search history.

(56) References Cited

U.S. PATENT DOCUMENTS

| | | | |
|---|---|---|---|
| 11,741,321 B2 | 8/2023 | Kawasaki | |
| 2005/0200910 A1* | 9/2005 | Kanoshima | H04N 1/0084 358/448 |
| 2006/0226987 A1 | 10/2006 | Nagase | |
| 2006/0266818 A1* | 11/2006 | Oyama | B42C 19/06 235/375 |
| 2007/0133039 A1 | 6/2007 | Yamada | |

OTHER PUBLICATIONS

Notice of Allowance on U.S. Appl. No. 17/888,707 Dtd Jun. 21, 2023.

* cited by examiner

*Primary Examiner* — Hoang X Ngo
(74) *Attorney, Agent, or Firm* — FOLEY & LARDNER LLP

(57) ABSTRACT

A conductive sheet that is configured to be stacked between a sheet tray of an image forming device and a sheet. The conductive sheet includes a base layer and a regulator. The base layer comprises a conductive material. The base layer is configured to be stacked between the sheet tray and the sheet so that the conductive material overlaps with a wireless tag of the sheet. The regulator is configured to regulate conveyance of the conductive sheet by the image forming device when the conductive sheet is stacked between the sheet tray and the sheet so that the conductive material overlaps with the wireless tag of the sheet.

20 Claims, 10 Drawing Sheets

CONDUCTIVE SHEET AND SHEET BUNDLE PACKAGE

CROSS-REFERENCE TO RELATED APPLICATION

This application is a continuation of U.S. patent application Ser. No. 17/888,707, filed Aug. 16, 2022, which is based upon and claims the benefit of priority from Japanese Patent Application No. 2021-178653, filed on Nov. 1, 2021, both of which are incorporated herein by reference in their entireties.

FIELD

Embodiments described herein relate generally to a conductive sheet and a sheet bundle package.

BACKGROUND

An image forming device that forms an image on a sheet is used. There is a sheet having a wireless tag from and to which information is read and written. Reading and writing may be erroneously executed on the sheet that is not a target of reading and writing. It is required to prevent erroneous reading and writing.

DETAILED DESCRIPTION

In general, according to one embodiment, a conductive sheet capable of preventing erroneous reading and writing is provided.

According to an embodiment, a conductive sheet can be provided between a sheet tray of an image forming device and a sheet. The conductive sheet has a conductivity in a region overlapping with a wireless tag of the sheet. The conductive sheet includes a double conveyance prevention structure configured to prevent conveyance in a state in which the conductive sheet overlaps the sheet.

Hereinafter, a conductive sheet and a sheet bundle package according to the embodiment will be described with reference to drawings.

Figure 1:
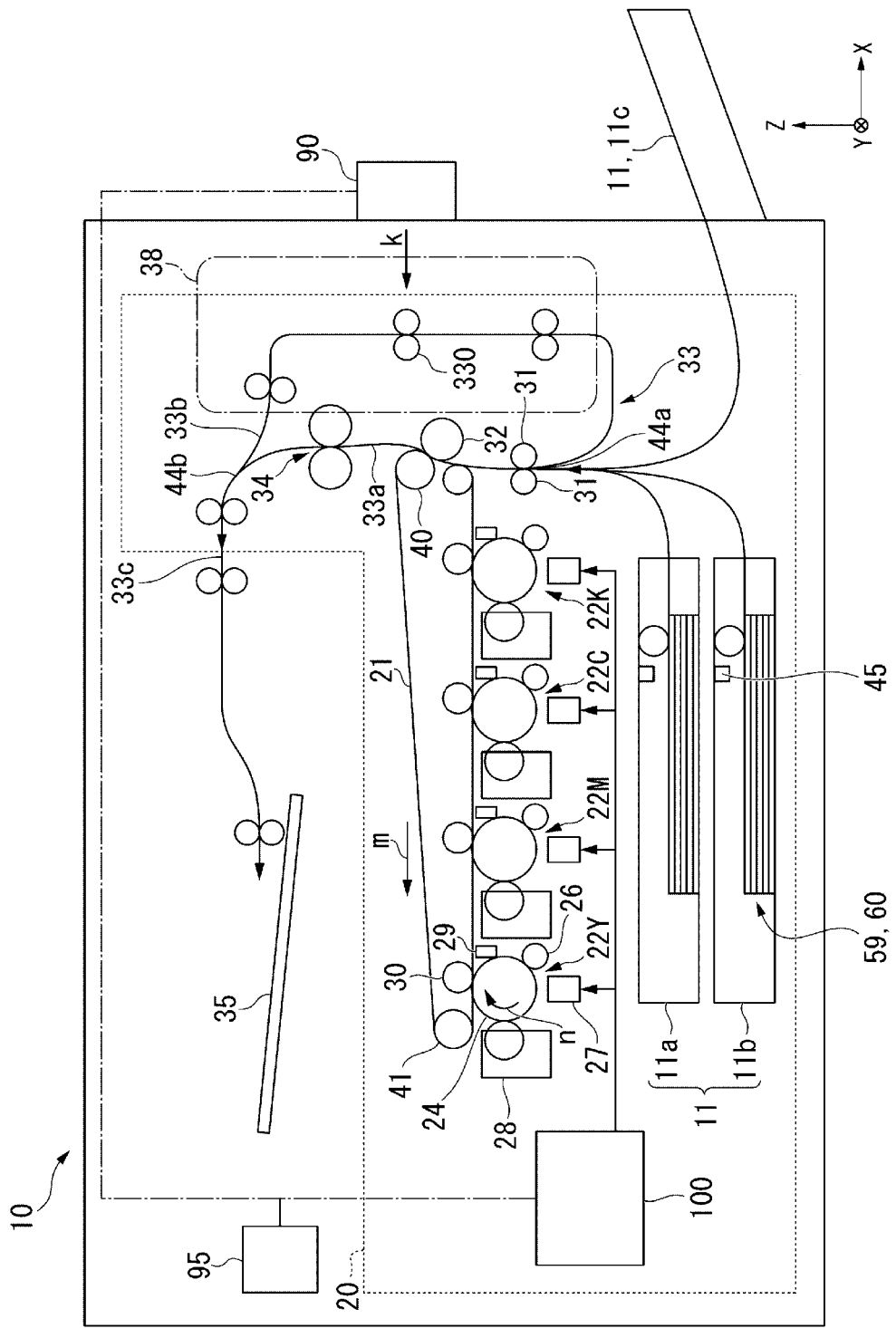
FIG. 1 is an explanatory view illustrating an example of a configuration of an image forming device.

First, a configuration of an image forming device 10 according to the embodiment will be described with reference to FIG. 1. FIG. 1 is an explanatory view illustrating an example of the configuration of the image forming device 10.

In FIG. 1, the image forming device 10 includes a control panel 95, a wireless tag communication device 90 (a transceiver, a receiver, a reader, etc.), and a printer unit 20 (a printer). The printer unit 20 includes a control unit 100 (a control system, a controller, etc.), paper feed cassettes 11a, 11b, and the like. The control unit 100 controls the control panel 95, the wireless tag communication device 90, and the printer unit 20. The control unit 100 controls conveyance of a sheet in the printer unit 20. The control of the conveyance of the sheet is to control a conveyance timing of the sheet, a stop position of the sheet, a conveyance speed of the sheet, and the like.

The control panel 95 includes an input key and a display unit (a display). For example, the input key accepts input from a user. For example, the display unit is a touch panel type. The display unit accepts input from the user and executes display to the user. For example, the control panel 95 displays an item related to an operation of the image forming device 10 on the display unit such that the item is settable. The control panel 95 notifies the control unit 100 of the item set by the user.

The paper feed cassettes 11a, 11b contain the sheet on which a wireless tag is provided. Certainly, the paper feed cassettes 11a, 11b can also contain a sheet on which no wireless tag is provided. In the following description, unless otherwise specified, the sheet is a sheet on which the wireless tag is provided. For example, a material such as paper and a plastic film is used for the sheet.

The printer unit 20 performs an operation of forming an image. For example, the printer unit 20 forms an image indicated by image data on the sheet. In the following description, forming the image on the sheet is also referred to as "printing". In the present embodiment, the printer unit 20 is a device that fixes a toner image. Alternatively, the printer unit 20 is not limited to this, and may be an ink jet type device.

The printer unit 20 includes an intermediate transfer belt 21. The printer unit 20 supports the intermediate transfer belt 21 with a driven roller 41, a backup roller 40, and the like. The printer unit 20 rotates the intermediate transfer belt 21 in a direction of an arrow m. The printer unit 20 includes four sets of image forming stations 22Y, 22M, 22C, and 22K. The image forming stations 22Y, 22M, 22C, and 22K correspond to yellow (Y), magenta (M), cyan (C), and black (K), respectively. The image forming stations 22Y, 22M, 22C, and 22K are arranged on a lower side of the intermediate transfer belt 21 along a rotation direction of the intermediate transfer belt 21.

Hereinafter, among the image forming stations 22Y, 22M, 22C, and 22K, the image forming station 22Y of the yellow (Y) will be described as an example. Since the image forming stations 22M, 22C, and 22K have the same configuration as the image forming station 22Y, a detailed description thereof will be omitted.

The image forming station 22Y includes an electric charger 26, an exposure scanning head 27, a developing device 28, and a photoconductor cleaner 29. The electric charger 26, the exposure scanning head 27, the developing device 28, and the photoconductor cleaner 29 are provided around a photoconductor drum 24 that rotates in a direction of an arrow n.

The image forming station 22Y includes a primary transfer roller 30. The primary transfer roller 30 faces the photoconductor drum 24 via the intermediate transfer belt 21.

The electric charger 26 uniformly charges the photoconductor drum 24. The exposure scanning head 27 exposes the uniformly charged photoconductor drum 24 to form an electrostatic latent image on the photoconductor drum 24. The developing device 28 develops the electrostatic latent image on the photoconductor drum 24 using a two-component developer formed of a toner and a carrier.

The primary transfer roller 30 primary transfers the toner image formed on the photoconductor drum 24 to the intermediate transfer belt 21. Each of the primary transfer rollers 30 of the image forming stations 22Y, 22M, 22C, and 22K primary transfers the toner image to the intermediate transfer belt 21, so that a color toner image is formed on the intermediate transfer belt 21. The color toner image is a toner image formed by sequentially superimposing the toner images of the yellow (Y), the magenta (M), the cyan (C), and the black (K). The photoconductor cleaner 29 removes the toner remaining on the photoconductor drum 24 after the primary transfer.

The printer unit 20 includes a secondary transfer roller 32. The secondary transfer roller 32 faces the backup roller 40 via the intermediate transfer belt 21. The secondary transfer roller 32 collectively and secondarily transfers the color toner image on the intermediate transfer belt 21 to the sheet. In the following description, the "toner image" may be either the color toner image or the toner image of only one color. In addition, the toner image may be a toner image using a decolorable toner.

A conveyance path 33 is a path through which the sheet is conveyed by a plurality of conveyance rollers (for example, a conveyance roller 330). The conveyance path 33 includes a first conveyance path 33a, a second conveyance path 33b, and a third conveyance path 33c. The first conveyance path 33a is a conveyance path from a merging portion 44a to a branch portion 44b. The second conveyance path 33b is a conveyance path that passes through a double-sided printing device 38, and is a conveyance path from the branch portion 44b to the merging portion 44a, which is different from the first conveyance path 33a. The third conveyance path 33c is a conveyance path from the branch portion 44b to a paper discharge tray 35.

The sheet is picked up from the sheet placing portion 11 of any of the paper feed cassette 11a, the paper feed cassette 11b, and a manual feed tray 11c. The sheet picked up from the sheet placing portion 11 is temporarily stopped at a portion where two stopped registration rollers 31 are in contact with each other. At this time, a tip of the sheet abuts against the registration rollers 31, and inclination of the sheet is corrected. The control unit 100 starts rotation of the registration rollers 31 according to a position of the toner image on the rotating intermediate transfer belt 21 to move the sheet to a position of the secondary transfer roller 32.

The toner image formed on the intermediate transfer belt 21 is secondarily transferred to the sheet by the secondary transfer roller 32. Further, the secondary transferred toner image is fixed to the sheet by a fixing device 34. In this way, an image is formed on the sheet by the control of the control unit 100. The control unit 100 conveys the sheet on which the toner image is fixed by the fixing device 34 to the third conveyance path 33c, and discharges the sheet.

The wireless tag communication device 90 includes a calculation device (a calculator), a storage device (a memory), and an antenna (not shown). The wireless tag according to the present embodiment is, for example, a radio frequency identification (RFID) tag. The wireless tag communication device 90 transmits a radio wave in a direction of an arrow k, for example. The wireless tag communication device 90 communicates with the wireless tag provided on the sheet via the antenna. Specifically, the wireless tag communication device 90 reads information from the wireless tag and writes the information on the wireless tag.

The information written on the wireless tag includes, for example, if the sheet is used for physical distribution or the like, information indicating a content, information indicating a destination, a content printed on the sheet, and the like. According to the present embodiment, the wireless tag communication device 90 uses, for example, an ultra-high frequency (UHF) in the 860 megahertz (MHz) to 960 MHz band. However, the RFID method and the frequency band are not limited to this, and other methods and frequency bands can be adopted.

The control unit 100 controls each unit of the image forming device 10.

Figure 2:
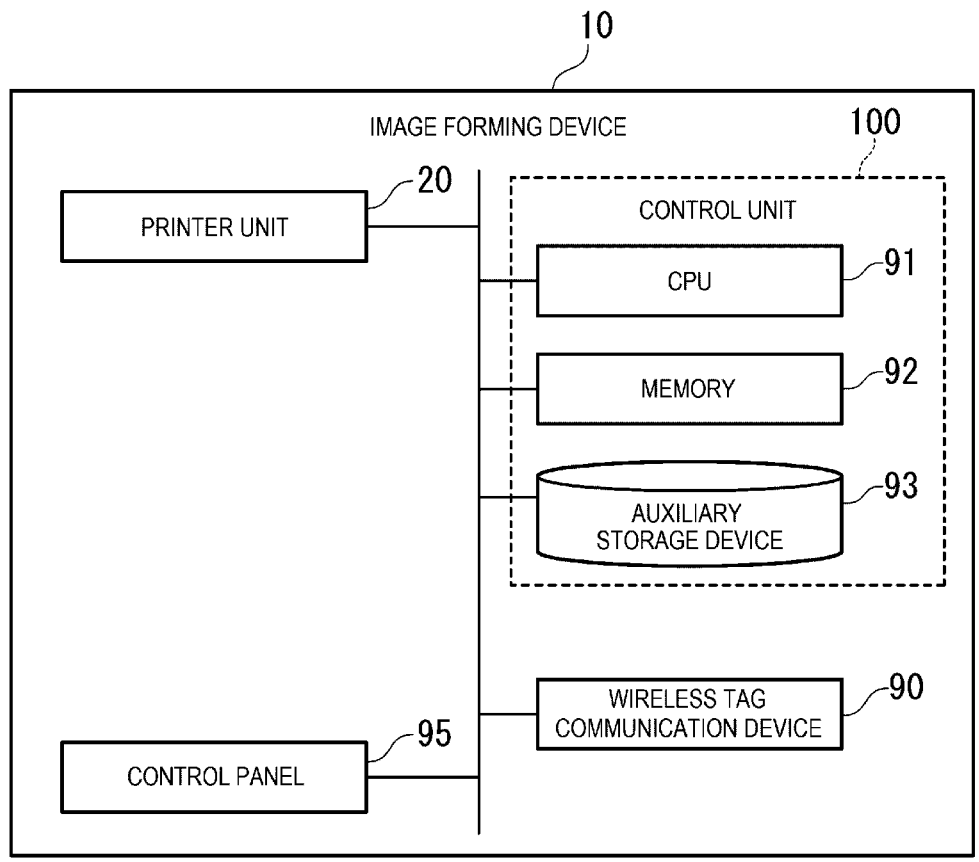
FIG. 2 is a hardware configuration diagram of the image forming device of FIG. 1.

FIG. 2 is a hardware configuration diagram of the image forming device 10. The control unit 100 of the image forming device 10 includes a central processing unit (CPU) 91, a memory 92, an auxiliary storage device 93, and the like that are connected by a bus, and executes a program. The image forming device 10 functions as a device including the printer unit 20, the control panel 95, and the wireless tag communication device 90 by executing the program.

The CPU 91 functions as the control unit 100 by executing the program stored in the memory 92 and the auxiliary storage device 93. The control unit 100 controls an operation of each functional unit of the image forming device 10.

The auxiliary storage device 93 is implemented using a storage device such as a magnetic hard disk device or a semiconductor storage device. The auxiliary storage device 93 stores information.

A paper feed unit of an image forming device will be described in detail.

Figure 3:
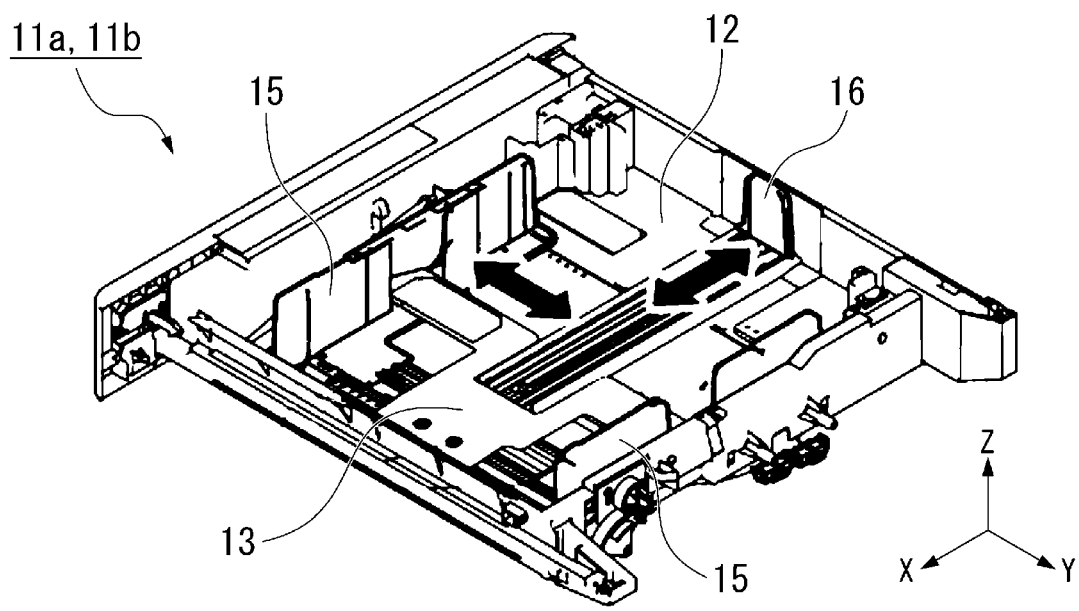
FIG. 3 is a perspective view of a paper feed cassette of the image forming device of FIG. 1.

FIG. 3 is a perspective view of paper feed cassettes. In the present application, a Z direction, an X direction, and a Y direction of an orthogonal coordinate system are defined as follows. The Z direction is a vertical direction, and a +Z direction is an upward direction. The X direction and the Y direction are horizontal directions. The X direction is a left-right direction toward the front of the image forming device 10. A +X direction is a direction in which the sheet is conveyed from the paper feed cassettes 11a, 11b. The Y direction is a front-rear direction of the image forming device 10. A +Y direction is a direction from the front to the back toward the front of the image forming device 10.

The paper feed cassettes 11a, 11b contain the sheet inside. The paper feed cassettes 11a, 11b are attachable to and detachable from the image forming device 10. The paper feed cassettes 11a, 11b include a cassette body 12, a sheet tray 13, side guides 15, and an end guide 16. The cassette body 12 has a drawer shape.

The sheet tray 13 is formed in a plate shape by a metal material or the like. The sheet tray 13 is provided on a bottom plate of the cassette body 12. The sheet tray 13 is provided closer to the +X direction inside the cassette body 12. The sheet tray 13 is rotatable. An end portion of the sheet tray 13 in a −X direction is a rotation axis, and an end portion of the sheet tray 13 in the +X direction moves in an upper-lower direction. The sheet is provided on the sheet tray 13. The sheet tray 13 lifts an end portion of the sheet in the +X direction toward a pickup roller to be described later.

The side guides 15 are formed in a flat plate shape in which the Y direction is a thickness direction. A pair of the side guides 15 are provided apart from each other in the Y direction. The pair of side guides 15 abut against both end portions of the sheet in the Y direction. The side guides 15 regulate movement of the sheet in the Y direction.

An end guide 16 is formed in a flat plate shape in which the X direction is a thickness direction. The end guide 16 abuts against an end portion of the sheet in the −X direction. The end guide 16 regulates movement of the sheet in the −X direction.

Figure 4:
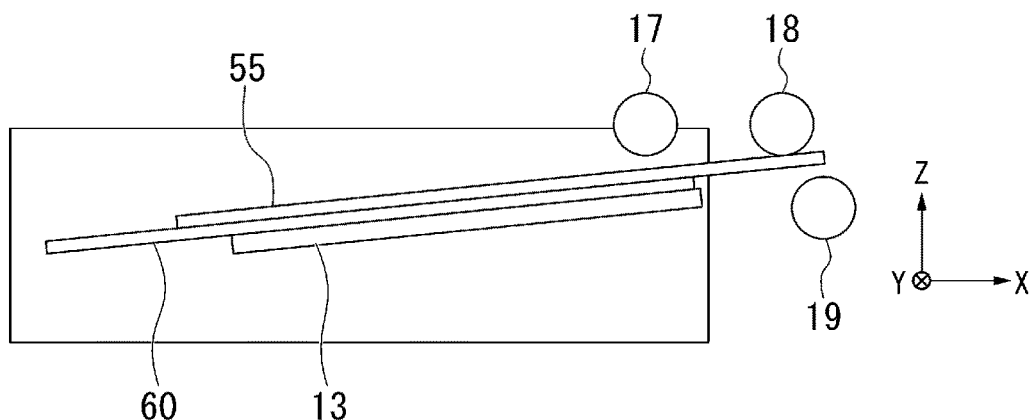
FIG. 4 is a first explanatory view of an operation of a paper feed mechanism of the image forming device of FIG. 1.
Figure 5:
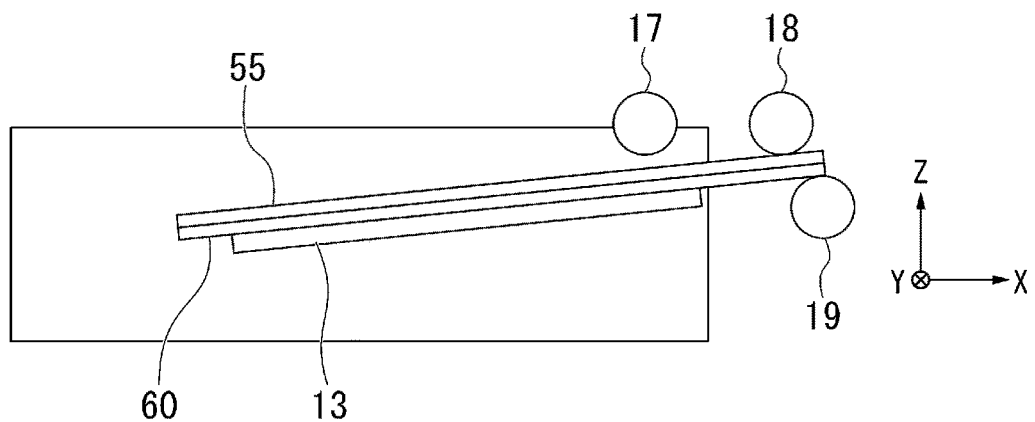
FIG. 5 is a second explanatory view of the operation of the paper feed mechanism of the image forming device of FIG. 1.

FIG. 4 is a first explanatory view of an operation of a paper feed mechanism, and FIG. 5 is a second explanatory view. The image forming device 10 includes a pickup roller 17, a paper feed roller 18, and a separation roller 19 as the paper feed mechanism.

The pickup roller 17 is provided above the end portion of the sheet tray 13 in the +X direction. The pickup roller 17 abuts against an upper surface of a sheet 55 placed on the sheet tray 13. The pickup roller 17 is rotationally driven. The pickup roller 17 conveys the sheet 55 in the +X direction.

The paper feed roller 18 is provided on the pickup roller 17 in the +X direction. The paper feed roller 18 is rotationally driven.

The separation roller 19 is provided on the paper feed roller 18 in a −Z direction. The separation roller 19 is driven to rotate with the rotation of the paper feed roller 18. The separation roller 19 includes a torque limiter.

The pickup roller 17 conveys the sheet 55 toward a nip of the paper feed roller 18 and the separation roller 19. As illustrated in FIG. 4, when one sheet 55 is conveyed, the paper feed roller 18 and the separation roller 19 rotate together. Accordingly, the sheet 55 is conveyed downstream.

As illustrated in FIG. 5, a plurality of the sheets 55 may be overlapped and conveyed (double-conveyed) by the pickup roller 17. The paper feed roller 18 rotates to convey the upper sheet 55 downstream. The separation roller 19 does not rotate and stops conveyance of the lower sheet. Accordingly, only the upper sheet 55 is conveyed downstream. After the upper sheet 55 is conveyed, the lower sheet 55 is conveyed downstream by the paper feed roller 18.

An empty sensor 45 will be described.

As illustrated in FIG. 1, the image forming device 10 includes the empty sensor 45. The empty sensor 45 detects the absence of the sheet 55 in the sheet placing portion 11.

Figure 6:
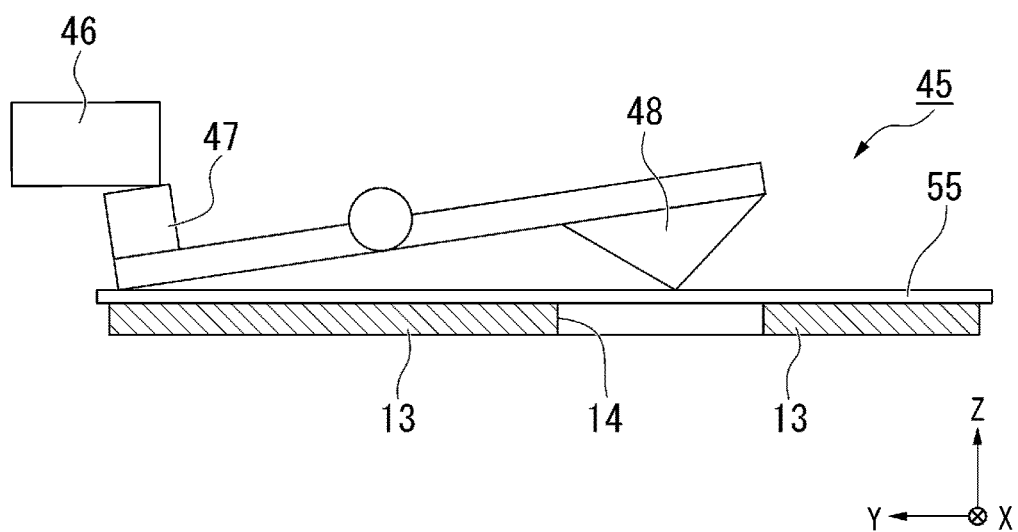
FIG. 6 is a first explanatory view of an operation of an empty sensor of the image forming device of FIG. 1.
Figure 7:
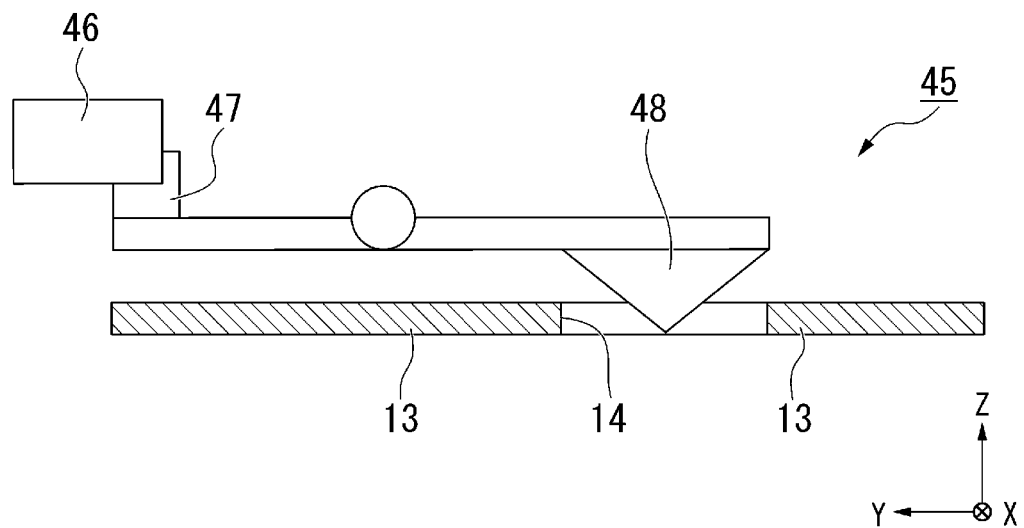
FIG. 7 is a second explanatory view of the empty sensor of the image forming device of FIG. 1.

FIG. 6 is a first explanatory view of an operation of an empty sensor, and FIG. 7 is a second explanatory view. The empty sensor 45 includes a light irradiation unit 46, a shutter 47, and a trigger 48. The light irradiation unit 46 radiates light from a light projecting unit (a light projector) toward a light receiving unit (a light receiver). The shutter 47 can block the light of the light irradiation unit 46. The shutter 47 is movable in conjunction with the trigger 48. The trigger 48 can fall on a tray window portion 14 of the sheet tray 13. The tray window portion 14 penetrates the sheet tray 13 in a thickness direction. The tray window portion 14 is used for detecting the absence of the sheet 55 by the empty sensor 45.

In FIG. 6, the sheet 55 is present on the sheet tray 13. The trigger 48 is supported by the sheet 55 and does not fall on the tray window portion 14. The shutter 47 does not block the light of the light irradiation unit 46. The empty sensor 45 does not detect the absence of the sheet.

In FIG. 7, the sheet 55 is not present on the sheet tray 13. The trigger 48 is not supported by the sheet 55 and falls on the tray window portion 14. The shutter 47 blocks the light of the light irradiation unit 46. The empty sensor 45 detects the absence of the sheet.

First Embodiment

A conductive sheet and a sheet bundle package according to a first embodiment will be described in detail.

Figure 8:
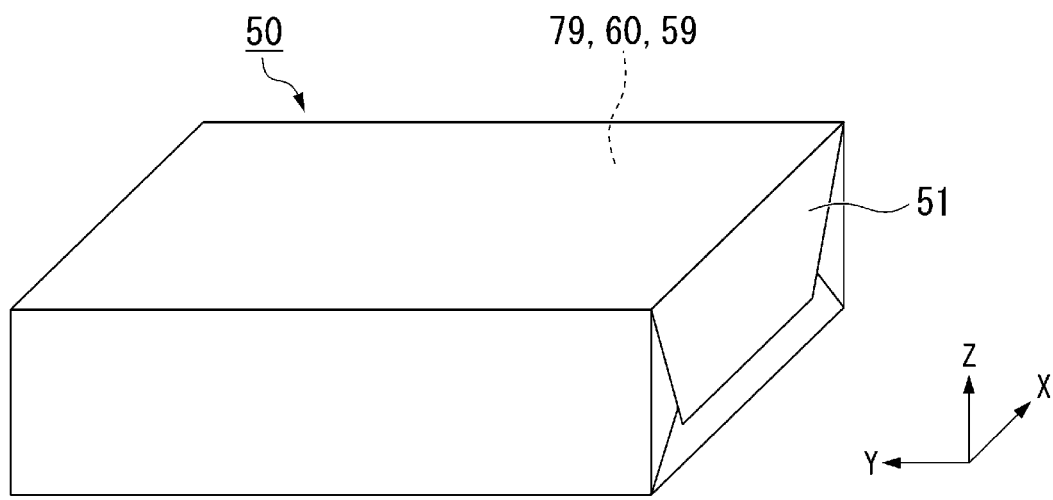
FIG. 8 is a perspective view of a sheet bundle package.
Figure 9:
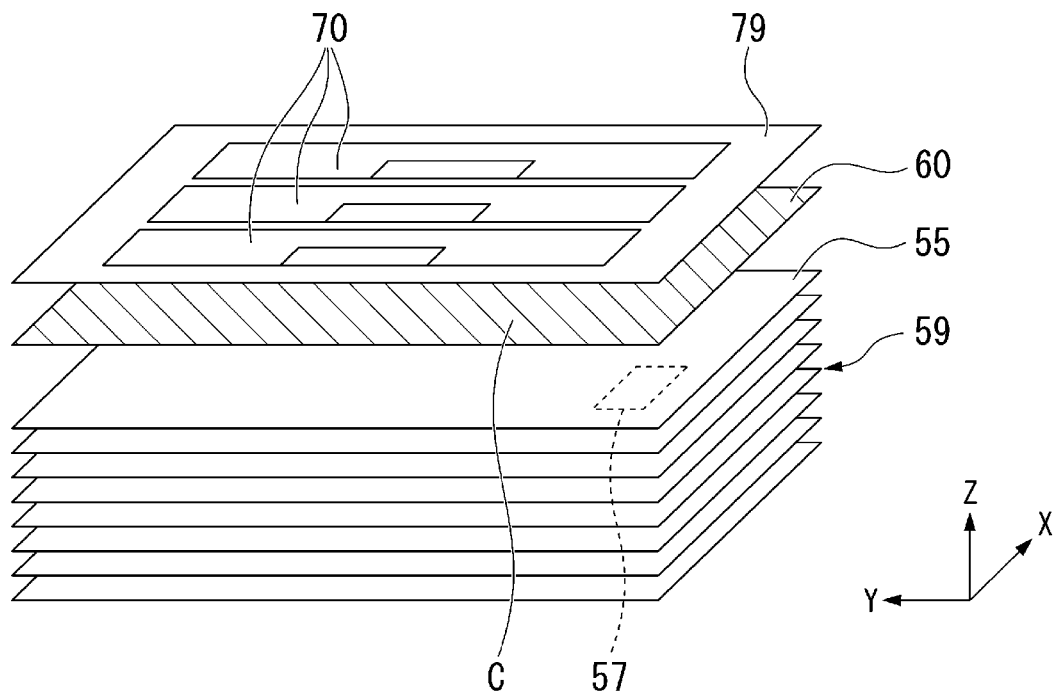
FIG. 9 is a perspective view of an inclusion of the sheet bundle package of FIG. 8.

FIG. 8 is a perspective view of the sheet bundle package. The sheet bundle package 50 is obtained by packing an inclusion with a package material 51 such as paper. FIG. 9 is a perspective view of the inclusion of the sheet bundle package. The sheet bundle package 50 includes a sheet bundle 59, a conductive sheet 60, and a seal mount 79 as the inclusions. The sheet bundle 59 is formed by stacking the plurality of sheets 55 in the Z direction.

The sheet 55 includes a wireless tag 57. The wireless tag 57 is embedded inside the sheet 55. The wireless tag 57 may be mounted on a surface of the sheet 55. As viewed from the Z direction, the wireless tag 57 is provided on a part of the sheet 55. For example, the wireless tag 57 is a radio frequency identification (RFID) tag.

A size of the conductive sheet 60 is the same as that of the sheet 55. A thickness of the conductive sheet 60 may be the same as or different from that of the sheet 55. A base material or layer of the conductive sheet 60 is formed of a resin material or the like. The conductive sheet has a conductive region C formed of a conductive material. As viewed from the Z direction, the conductive region C overlaps the wireless tag 57 of the sheet 55. In an example in FIG. 6, an entire surface of the conductive sheet 60 is the conductive region C. For example, the conductive material is a metal material such as aluminum. For example, the conductive region C is formed by vapor deposition of aluminum on the base material of the conductive sheet 60. The base material of the conductive sheet 60 may alternatively be formed of the conductive material.

A sheet, that is, a target of reading and writing executed by the wireless tag communication device 90 in FIG. 1 is a sheet moving along the conveyance path 33. The sheet 55 set in the sheet placing portion 11 is not the target of reading and writing executed by the wireless tag communication device 90. If the plurality of sheets 55 are present on the sheet placing portion 11, the wireless tags 57 of the sheets 55 overlap each other in the Z direction. An impedance of an antenna of the wireless tag 57 decreases, matching with a chip that is broken, and a communication between the wireless tag 57 and the wireless tag communication device 90 becomes difficult. Accordingly, erroneous reading and writing for the plurality of sheets 55 provided on the sheet placing portion 11 is prevented.

When the sheet 55 on the sheet placing portion 11 is consumed for printing and the remaining sheets 55 become one sheet (i.e., all of the sheets 55 have been consumed for printing expect for one sheet), the wireless tags 57 do not overlap in the Z direction. It is necessary to prevent the erroneous reading and writing for the one sheet 55.

As illustrated in FIG. 4, the conductive sheet 60 is provided between the sheet tray 13 and the sheet 55. The conductive sheet 60 is present below the remaining one sheet 55. As viewed from the Z direction, the conductive region C of the conductive sheet 60 overlaps with the wireless tag 57 of the sheet 55. The impedance of the antenna of the wireless tag 57 decreases, and the communication between the wireless tag 57 and the wireless tag communication device 90 becomes difficult. Accordingly, the erroneous reading and writing for the remaining one sheet on the sheet placing portion 11 is prevented.

Figure 10:
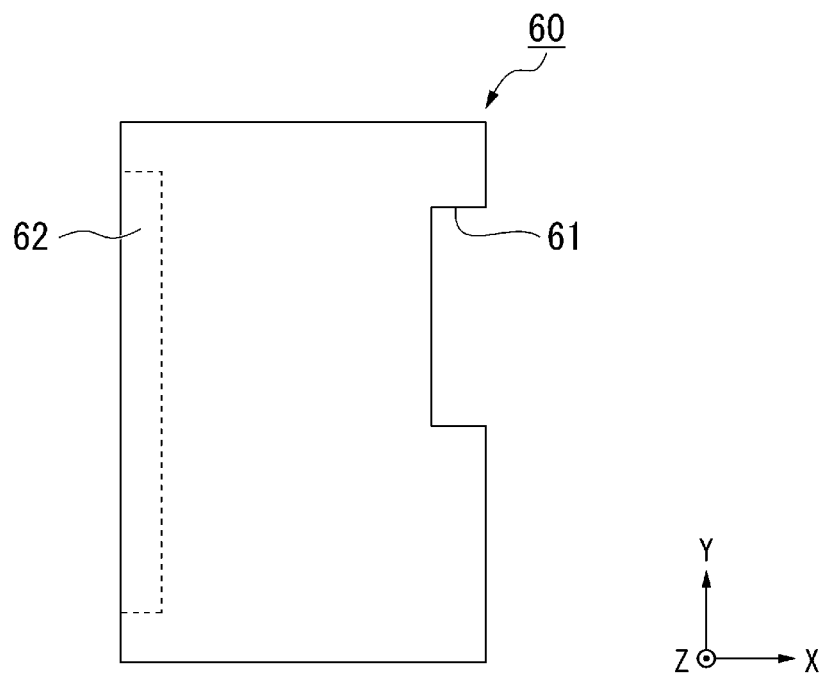
FIG. 10 is a plan view of a conductive sheet of the inclusion of FIG. 9 according to a first embodiment.
Figure 11:
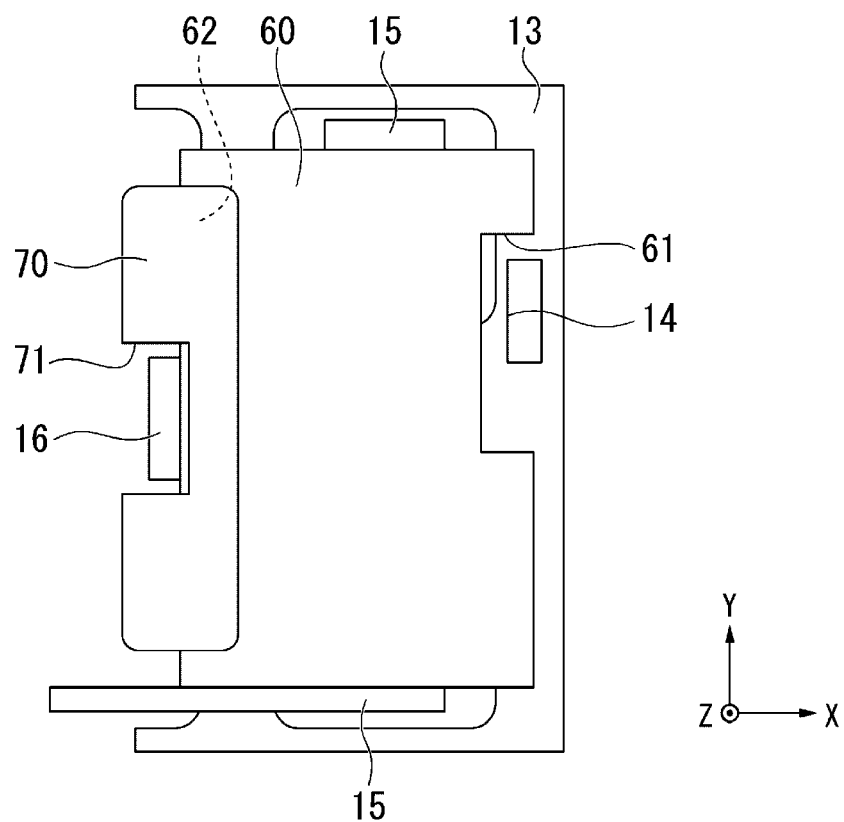
FIG. 11 is a plan view of a state of the conductive sheet of FIG. 10 being mounted on a sheet placing portion.

FIG. 10 is a plan view of the conductive sheet according to the first embodiment. FIG. 11 is a plan view of a state in which the conductive sheet according to the first embodiment is mounted on a sheet placing portion. As illustrated in FIG. 11, the sheet tray 13 has the tray window portion 14 described above. The tray window portion 14 is used for detecting the absence of the sheet 55. The tray window portion 14 is provided at the end portion of the sheet tray 13 in the +X direction.

The conductive sheet 60 has a base layer that defines a notch 61. The notch 61 is formed at an end portion of the conductive sheet 60 in the +X direction. As viewed from the Z direction, the notch 61 is formed at a position overlapping the tray window portion 14. As viewed from the Z direction, at least a part of the tray window portion 14 is exposed from the notch 61.

The conductive sheet 60 is provided on the sheet tray 13 of the sheet placing portion 11, and the sheet bundle 59 is provided on the conductive sheet 60. If all the sheets 55 of the sheet bundle 59 are consumed for printing, only the conductive sheet 60 remains on the sheet tray 13. The trigger 48 of the empty sensor 45 illustrated in FIG. 7 passes through the notch 61 of the conductive sheet 60 and falls to the tray window portion 14. The empty sensor 45 detects the absence of the sheet 55.

If it is detected that the sheet 55 is absent, the control unit 100 in FIG. 1 displays the detection result on the control panel 95. The control unit 100 stops a printing job. The conductive sheet remains in the sheet placing portion 11. The user of the image forming device 10 sets a new sheet bundle 59 on the conductive sheet 60 and restarts the printing job. When a size of the sheet to be printed is changed, the user picks up the conductive sheet 60 of the old size. The user sets a conductive sheet 60 of a new size and the sheet bundle 59 of the new size and restarts the printing job.

If a large number of sheets 55 in the sheet bundle 59 are consumed for printing, a small number of sheets 55 and the conductive sheet 60 remain on the sheet tray 13. As illustrated in FIG. 5, the pickup roller 17 may double-convey the sheet 55 and the conductive sheet 60. The separation roller 19 stops the conveyance of the lower conductive sheet 60. The conductive sheet 60 stops at a position of the separation roller 19. A position of the notch 61 is separated from the tray window portion 14, and the tray window portion 14 is covered with the conductive sheet 60. Since the trigger 48 does not fall on the tray window portion 14, the empty sensor 45 does not detect the absence of the sheet 55. The printing job may continue and the conductive sheet 60 may be conveyed downstream. It is required to prevent the double conveyance of the sheet 55 and the conductive sheet 60.

The conductive sheet 60 includes a double conveyance prevention structure that prevents the double conveyance with the sheet 55. The double conveyance prevention structure according to the first embodiment regulates a relative movement of the conductive sheet 60 with respect to the sheet tray 13. As illustrated in FIG. 10, the conductive sheet 60 has a seal attaching region 62 on an upper surface as the double conveyance prevention structure. The seal attaching region 62 is set along an edge side of the conductive sheet 60 in the −X direction. The seal attaching region 62 is displayed by a broken line or the like around the seal attaching region. The broken line or the like clearly indicates the position of the seal attaching region 62. As illustrated in FIG. 11, a fixed seal 70 is attached to the seal attaching region 62.

The fixed seal 70 has a low adhesion property on a lower surface and no adhesion property on an upper surface. The fixed seal 70 has a substantially rectangular shape in which the Y direction is a longitudinal direction and the X direction is a lateral direction. A width of the fixed seal 70 in the X direction is larger than a width of the seal attaching region 62 of the conductive sheet 60 in the X direction. About half of the fixed seal 70 in the +X direction is attached to the seal attaching region 62. About half of the fixed seal 70 in the −X direction is attached to the sheet tray 13 or a bottom plate of the sheet placing portion 11 (hereinafter, may be referred to as the sheet tray 13 or the like). Accordingly, the relative movement of the conductive sheet 60 with respect to the sheet tray 13 is regulated. The double conveyance of the conductive sheet 60 accompanying the conveyance of the sheet 55 is prevented.

A notch 71 is formed at an end portion of the fixed seal 70 in the −X direction. The notch 71 avoids interference between the fixed seal 70 and the end guide 16.

As described above, when the size of the sheet 55 to be printed is changed, the conductive sheet of a first old size is picked up from the sheet placing portion 11. In a state in which half of the fixed seal 70 in the +X direction is attached to the conductive sheet 60, half of the fixed seal in the −X direction is peeled from the sheet tray 13 or the like. Printing of the sheet 55 of a second size may return to printing of the sheet 55 of the first size again. At this time, in the state in which the half of the fixed seal 70 in the +X direction is attached to the conductive sheet 60, the half of the fixed seal 70 in the −X direction is attached again to the sheet tray 13 or the like. By repeating these operations, an adhesion force of the fixed seal 70 may decrease.

As illustrated in FIG. 9, the seal mount 79 stores a plurality of the fixed seals 70. The user picks up the fixed seals 70 one by one from the seal mount 79 and attaches the fixed seals to the conductive sheet 60. When the adhesion force of the old fixed seal 70 decreases, the user picks up the new fixed seal 70 from the seal mount 79 and attaches the new fixed seal 70 to the conductive sheet 60. Accordingly, the conductive sheet 60 can be reused for a long period of time.

An upper surface of the sheet bundle package 50 illustrated in FIG. 8 indicates that this surface is an upper surface and that the sheet bundle package 50 is to be opened with this surface facing up. The conductive sheet 60 and the seal mount 79 are arranged on the sheet bundle 59 as the inclusions of the sheet bundle package 50 illustrated in FIG. 9. The user who opens the package material 51 can notice the presence of the conductive sheet 60 and the seal mount 79. The sheet bundle package 50 includes an available manual that describes a method for using the conductive sheet 60 and the seal mount 79. The method for using the conductive sheet 60 and the seal mount 79 may be described on the upper surface of the conductive sheet 60 or may be described on the upper surface of the sheet bundle package 50.

A first modification of the first embodiment will be described.

Figure 12:
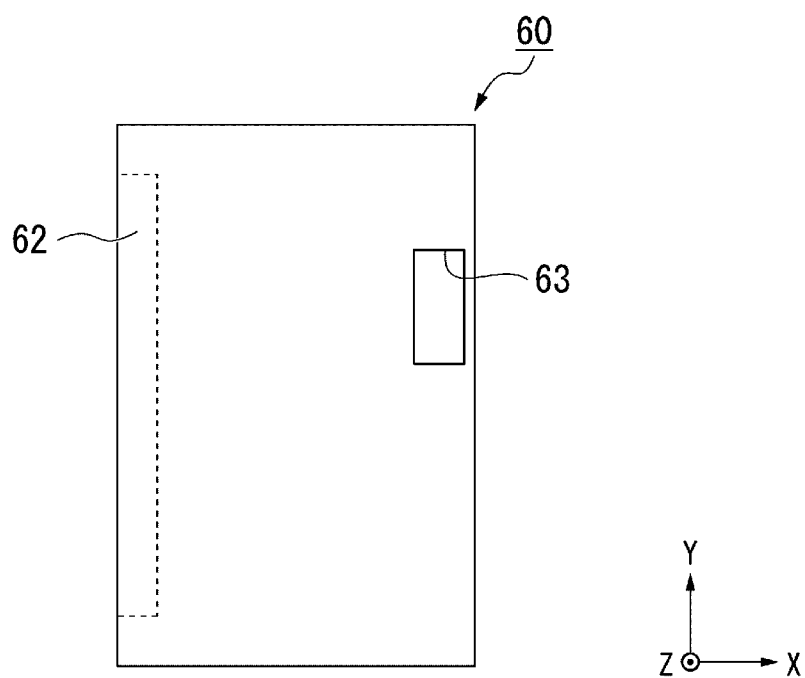
FIG. 12 is a plan view of a conductive sheet according to a first modification of the first embodiment of FIG. 10.

FIG. 12 is a plan view of a conductive sheet according to a first modification of the first embodiment. The conductive sheet 60 according to the first modification has a base layer that defines an aperture or first window portion 63 instead of the notch 61 of the conductive sheet 60 according to the first embodiment. The description of the first modification for the portion similar to that according to the first embodiment may be omitted.

As viewed from the Z direction, the first window portion 63 is formed at a position overlapping the tray window portion 14. As viewed from the Z direction, at least a part of the tray window portion 14 is exposed from the first window portion 63. The trigger 48 of the empty sensor 45 illustrated in FIG. 7 passes through the first window portion 63 of the conductive sheet 60 and falls to the tray window portion 14. The empty sensor 45 detects the absence of the sheet 55.

A second modification of the first embodiment will be described.

Figure 13:
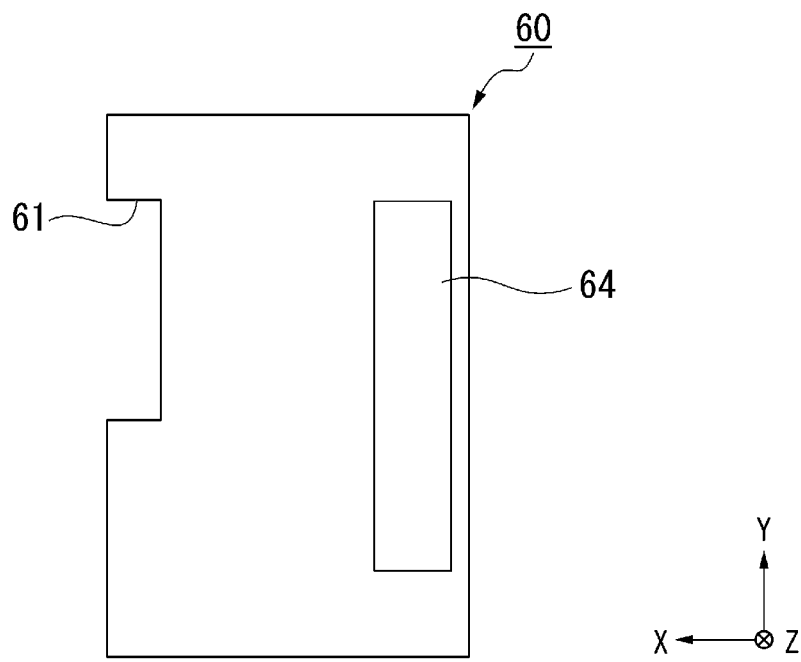
FIG. 13 is a bottom view of a conductive sheet according to a second modification of the first embodiment of FIG. 10.

FIG. 13 is a bottom view of a conductive sheet according to the second modification of the first embodiment. The conductive sheet 60 according to the second modification includes a double-sided tape 64 as a double conveyance prevention structure instead of the seal attaching region 62 of the conductive sheet 60 according to the first embodiment. The description of the second modification for the portion similar to that according to the first embodiment may be omitted.

The double-sided tape 64 has an adhesion property on both an upper surface and a lower surface. The upper surface of the double-sided tape 64 is attached to a lower surface of the conductive sheet 60 illustrated in FIG. 13. The double-sided tape 64 is attached along the edge side of the conductive sheet 60 in the −X direction. The lower surface of the double-sided tape 64 is covered with a protective sheet. The user peels off the protective sheet of the double-sided tape 64 and places the conductive sheet 60 on the sheet tray 13. The lower surface of the double-sided tape 64 is attached to the sheet tray 13. Accordingly, the relative movement of the conductive sheet with respect to the sheet tray 13 is regulated. The double conveyance of the conductive sheet accompanying the conveyance of the sheet 55 is prevented.

A third modification of the first embodiment will be described.

Figure 14:
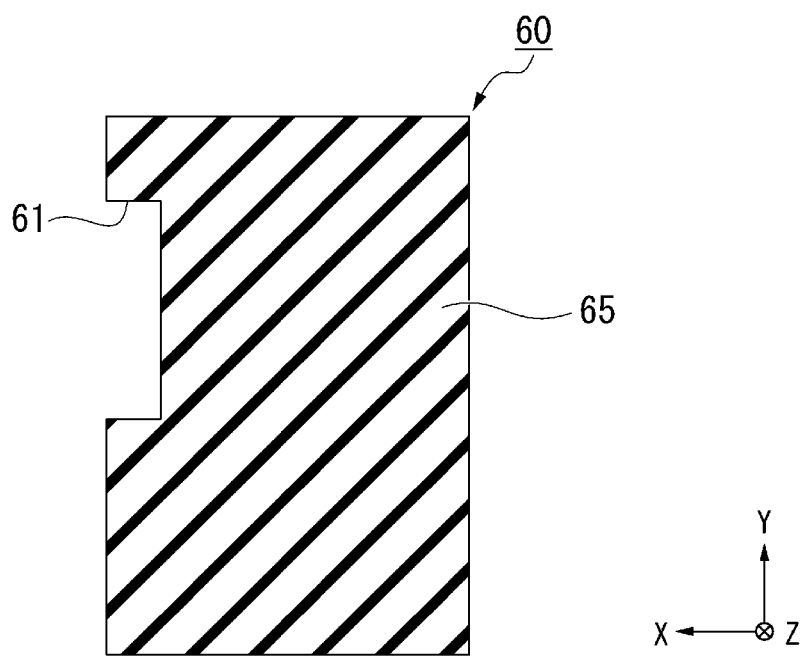
FIG. 14 is a bottom view of a conductive sheet according to a third modification of the first embodiment of FIG. 10.

FIG. 14 is a bottom view of a conductive sheet according to the third modification of the first embodiment. The conductive sheet 60 according to the second modification includes a resilient, high friction, or rubber sheet 65 as a double conveyance prevention structure instead of the seal attaching region 62 of the conductive sheet 60 according to the first embodiment. The description of the third modification for the portion similar to that according to the first embodiment may be omitted.

The rubber sheet 65 is a material having a high coefficient of friction. The rubber sheet 65 is mounted on the entire lower surface of the conductive sheet 60. The rubber sheet 65 may be mounted on a part of the lower surface of the conductive sheet 60. The conductive sheet 60 comes into contact with the sheet tray 13 via the rubber sheet 65. A frictional force acting on the conductive sheet 60 from the sheet tray 13 becomes large. Accordingly, the relative movement of the conductive sheet 60 with respect to the sheet tray 13 is regulated. The double conveyance of the conductive sheet 60 accompanying the conveyance of the sheet 55 is prevented.

The conductive sheet 60 according to the first embodiment described above uses the fixed seal 70 to regulate a relative position with respect to the sheet tray 13. On the other hand, the conductive sheet 60 according to the first to third modifications does not use the fixed seal 70. Therefore, the sheet bundle package 50 according to the first to third modifications does not include the seal mount 79 as an inclusion.

As described in detail above, the conductive sheet 60 according to an embodiment can be provided between the sheet tray 13 of the image forming device 10 and the sheet 55. The conductive sheet 60 has a conductivity in the region C that overlaps the wireless tag 57 of the sheet 55. The conductive sheet includes the double conveyance prevention structure that prevents the conveyance in a state in which the conductive sheet overlaps the sheet.

The conductive sheet 60 is provided between the sheet tray 13 and the sheet 55. The conductive sheet 60 has the conductive region C that overlaps with the wireless tag 57 of the sheet 55. Accordingly, even if the number of sheets 55 remaining on the sheet tray 13 becomes one, the erroneous reading and writing for the wireless tag 57 of the sheet 55 can be prevented.

The double conveyance prevention structure according to the first embodiment regulates the relative movement with respect to the sheet tray 13.

Even if the sheet 55 is conveyed from the sheet tray 13, the relative movement between the conductive sheet 60 and the sheet tray 13 is regulated. Therefore, the double conveyance of the conductive sheet 60 accompanying the conveyance of the sheet 55 is prevented.

The conductive sheet 60 has a magnetic force and may be adsorbed on or attracted onto the sheet tray 13.

The sheet bundle package 50 according to the embodiment includes the conductive sheet 60, the sheet bundle 59, and the package material 51 that are described above. The sheet bundle 59 is formed by stacking the sheets 55 each including the wireless tag 57. The package material 51 packs the sheet bundle 59 and the conductive sheet 60.

The sheet bundle 59 and the conductive sheet 60 are provided in the sheet bundle package 50. The conductive sheet 60 having the same size as the sheet 55 is placed on the sheet tray 13 together with the sheet 55. The conductive region C of the conductive sheet 60 overlaps with the wireless tag 57 of the sheet 55. Accordingly, even if the number of sheets 55 remaining on the sheet tray 13 becomes one, the erroneous reading and writing for the wireless tag 57 of the sheet 55 can be prevented.

Second Embodiment

Figure 15:
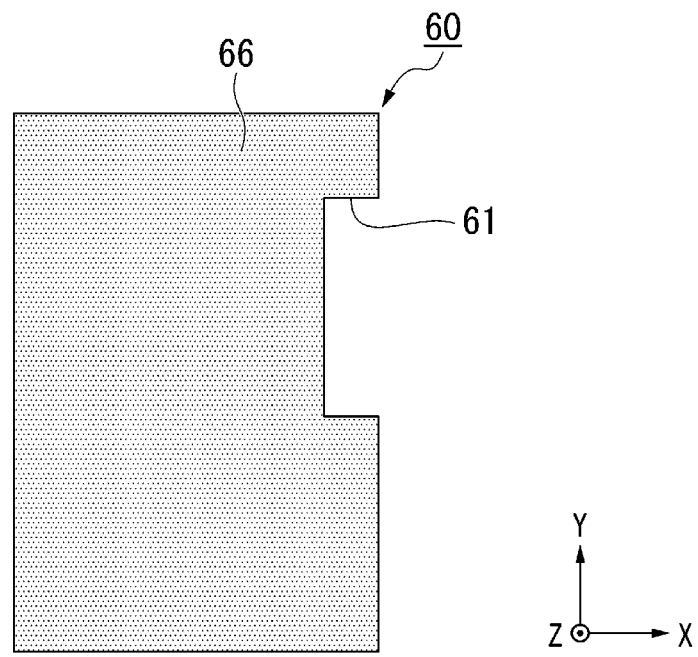
FIG. 15 is a plan view of a conductive sheet of the inclusion of FIG. 9 according to a second embodiment.

FIG. 15 is a plan view of a conductive sheet according to a second embodiment. The conductive sheet 60 according to the second embodiment is different from that according to the first embodiment in that the conductive sheet 60 according to the second embodiment includes a double conveyance prevention structure that prevents adsorption with the sheet 55. The description of the second embodiment for the portion similar to that according to the first embodiment may be omitted.

The conductive sheet 60 includes a fine concave-convex portion 66 as the double conveyance prevention structure. The concave-convex portion 66 is formed on the entire upper surface of the conductive sheet 60. The concave-convex portion 66 may be formed on a part of the upper surface of the conductive sheet 60. The concave-convex portion 66 may be formed on the lower surface of the conductive sheet 60 in addition to the upper surface of the conductive sheet 60. For example, the concave-convex portion 66 is formed by treating an upper surface of a plastic film, which is the base material or layer of the conductive sheet 60, with a chemical. The concave-convex portion 66 may be formed by blasting the upper surface of the plastic film with fine particles. Another plastic film including the concave-convex portion 66 may be attached to the upper surface of the base material or layer of the conductive sheet 60.

The sheet 55 is provided on the upper surface of the conductive sheet 60. A gap is formed between the conductive sheet 60 and the sheet 55 due to the concave-convex portion 66 on the upper surface of the conductive sheet 60. Accordingly, the adsorption due to static electricity between the conductive sheet 60 and the sheet 55 is prevented. The double conveyance of the conductive sheet 60 accompanying the conveyance of the sheet 55 is prevented.

As described above, the double conveyance prevention structure according to the second embodiment is the concave-convex portion 66 that prevents the adsorption between the conductive sheet 60 and the sheet 55.

Even if the upper sheet 55 is conveyed, the lower conductive sheet 60 is less likely to be conveyed. Therefore, the double conveyance of the conductive sheet 60 accompanying the conveyance of the sheet 55 is prevented.

Third Embodiment

Figure 16:
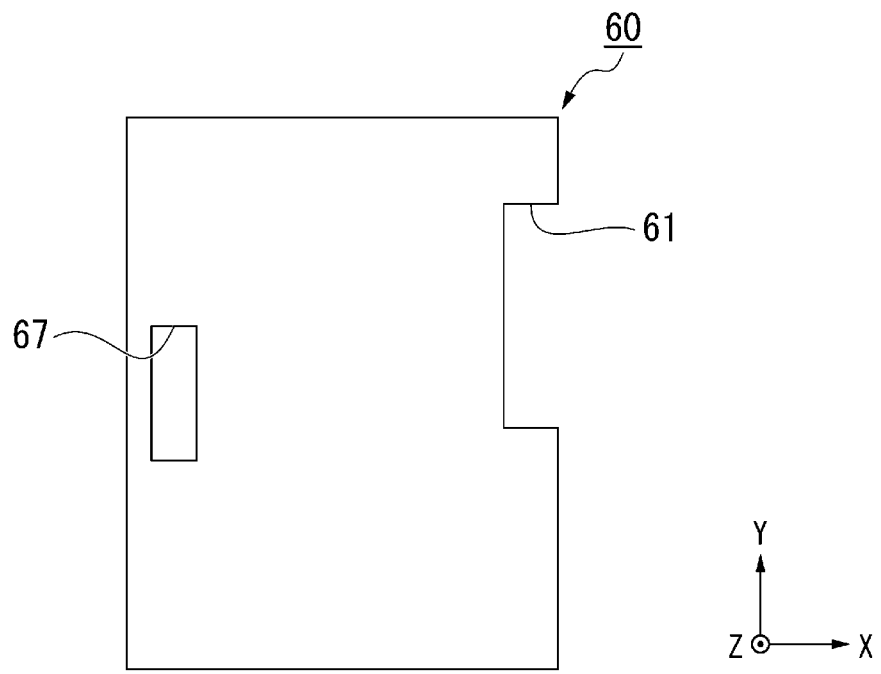
FIG. 16 is a plan view of a conductive sheet of the inclusion of FIG. 9 according to a third embodiment.
Figure 17:
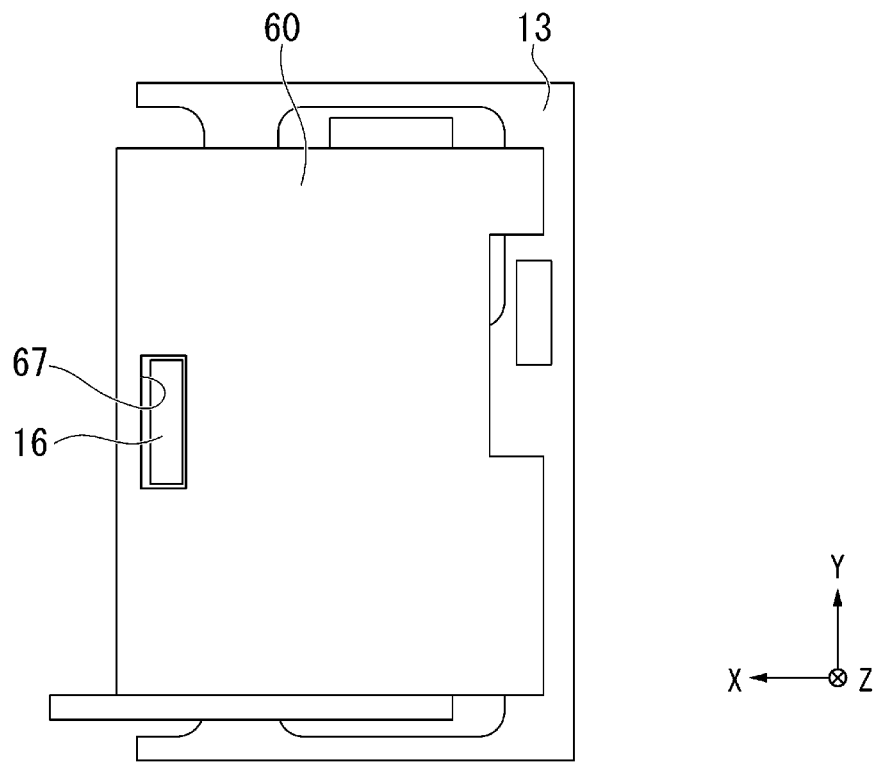
FIG. 17 is a plan view of a state of the conductive sheet of FIG. 16 being mounted on a sheet placing portion.

FIG. 16 is a plan view of a conductive sheet according to a third embodiment. FIG. 17 is a plan view of a state in which the conductive sheet according to the third embodiment is mounted on a sheet placing portion. The conductive sheet 60 according to the third embodiment is different from that according to the first embodiment in that the conductive sheet 60 according to the third embodiment includes a double conveyance prevention structure that regulates a relative movement with respect to the end guide 16. The description of the third embodiment for the portion similar to that according to the first embodiment may be omitted.

As illustrated in FIG. 16, the conductive sheet 60 includes a retaining aperture or second window portion 67 as the double conveyance prevention structure. A length of the conductive sheet 60 in the X direction is longer than that of the sheet 55. The second window portion 67 is formed at an end portion of the conductive sheet 60 in the −X direction. The second window portion 67 penetrates the conductive sheet 60 in a thickness direction.

As illustrated in FIG. 17, the conductive sheet 60 is provided on the sheet tray 13. The end guide 16 is inserted inside the second window portion 67. The sheet 55 is provided on the conductive sheet 60. The end guide 16 abuts against an end portion of the sheet 55 in the −X direction.

If a frictional force acts on the conductive sheet 60 accompanying the conveyance of the sheet 55, an inner periphery of the second window portion 67 abuts against the end guide 16. Accordingly, the relative movement of the conductive sheet 60 with respect to the end guide 16 is regulated. The double conveyance of the conductive sheet 60 accompanying the conveyance of the sheet 55 is prevented.

As described above, the double conveyance prevention structure according to the third embodiment is the second window portion 67 that regulates the relative movement with respect to the end guide 16.

Even if the sheet 55 is conveyed apart from the end guide 16, the relative movement between the conductive sheet 60 and the end guide 16 is regulated. Therefore, the double conveyance of the conductive sheet 60 accompanying the conveyance of the sheet 55 is prevented.

Fourth Embodiment

Figure 18:
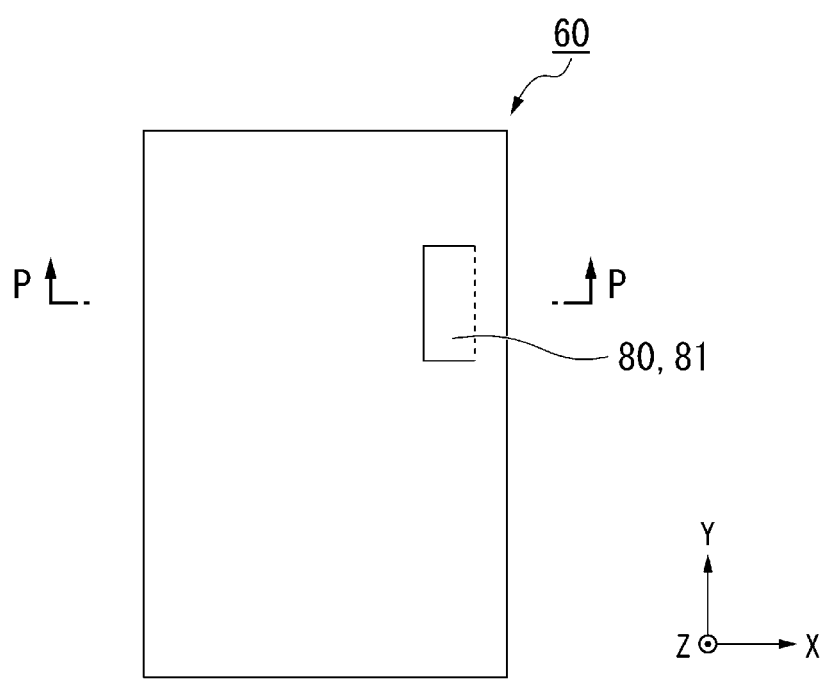
FIG. 18 is a plan view of a conductive sheet of the inclusion of FIG. 9 according to a fourth embodiment.
Figure 19:
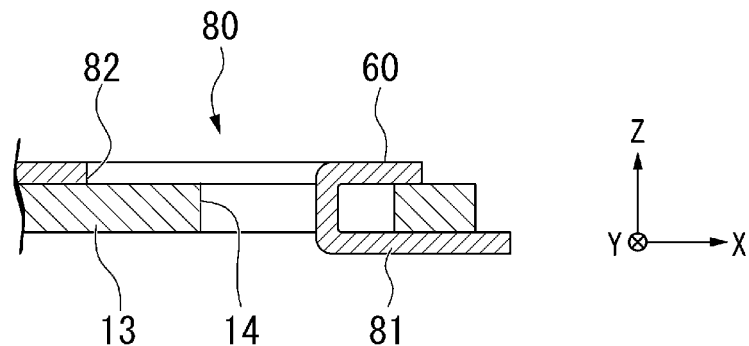
FIG. 19 is a cross-sectional view taken along a line P-P of the conductive sheet in FIG. 18.

FIG. 18 is a plan view of a conductive sheet according to a fourth embodiment. FIG. 19 is a cross-sectional view taken along a line P-P in FIG. 18. The conductive sheet 60 according to the fourth embodiment is different from that according to the first embodiment in that the conductive sheet 60 according to the fourth embodiment includes a double conveyance prevention structure that engages with the tray window portion 14. The description of the fourth embodiment for the portion similar to that according to the first embodiment may be omitted.

The conductive sheet 60 has an engage portion forming region 80 (a tab, a flap, a flange, etc.) as the double conveyance prevention structure. As viewed from the Z direction, an outer shape of the engage portion forming region 80 substantially matches the tray window portion 14 or is slightly smaller than the tray window portion 14. The engage portion forming region 80 has a rectangular shape. Notches that penetrate the conductive sheet 60 are formed at both edge sides of the engage portion forming region 80 in the Y direction and an edge side of the engage portion forming region 80 in the −X direction.

The user bends the engage portion forming region 80 in the −Z direction with an edge side of the engage portion forming region 80 in the +X direction as a broken line to form an engage portion 81. As illustrated in FIG. 19, the conductive sheet 60 is provided on the sheet tray 13 and the engage portion 81 is inserted into the tray window portion 14. The user bends a tip of the engage portion 81 in the +X direction on a back side of the sheet tray 13. The engage portion 81 engages with the tray window portion 14. Accordingly, the relative movement of the conductive sheet 60 with respect to the sheet tray 13 is regulated. The double conveyance of the conductive sheet 60 accompanying the conveyance of the sheet 55 is prevented.

Since the engage portion 81 is formed by bending the engage portion forming region 80, a third window portion 82 is formed in the engage portion forming region 80. As viewed from the Z direction, at least a part of the tray window portion 14 is exposed from the third window portion 82. The trigger 48 of the empty sensor 45 illustrated in FIG. 7 passes through the third window portion 82 of the conductive sheet 60 and falls to the tray window portion 14. The empty sensor 45 detects the absence of the sheet 55.

A first modification of the fourth embodiment will be described.

Figure 20:
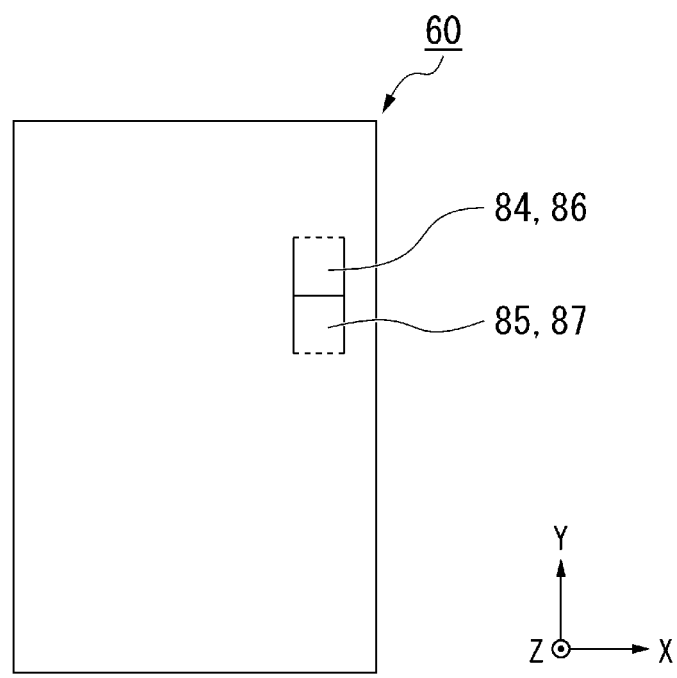
FIG. 20 is a plan view of a conductive sheet according to a first modification of the fourth embodiment of FIG. 18.

FIG. 20 is a plan view of a conductive sheet according to a first modification of the fourth embodiment. The conductive sheet 60 according to the first modification includes a pair of engage portion forming regions 84, 85 as the double conveyance prevention structure instead of the engage portion forming region 80 according to the fourth embodiment.

The description of the first modification for the portion similar to that according to the fourth embodiment may be omitted.

The pair of engage portion forming regions 84, 85 are the first engage portion forming region 84 and the second engage portion forming region 85 that are arranged in the Y direction. The first engage portion forming region 84 is formed in the +Y direction, and the second engage portion forming region 85 is formed in a −Y direction. As viewed from the Z direction, an entire outer shape of the pair of engage portion forming regions 84, 85 substantially matches the tray window portion 14 or is slightly smaller than the tray window portion 14. Notches are formed at both edge sides of the pair of engage portion forming regions 84, 85 in the X direction. A notch parallel to the X direction is formed between the first engage portion forming region 84 and the second engage portion forming region 85.

The user bends the first engage portion forming region 84 in the −Z direction with an edge side of the first engage portion forming region 84 in the +Y direction as a broken line to form a first engage portion 86. The user bends the second engage portion forming region 85 in the −Z direction with an edge side of the second engage portion forming region 85 in the −Y direction as a broken line to form a second engage portion 87. The first engage portion 86 and the second engage portion 87 are inserted into the tray window portion 14. The user bends a tip of the first engage portion 86 in the +Y direction on the back side of the sheet tray 13. The user bends a tip of the second engage portion 87 in the −Y direction on the back side of the sheet tray 13. The pair of engage portions engage with the tray window portion 14. Accordingly, the relative movement of the conductive sheet 60 with respect to the sheet tray 13 is regulated. The double conveyance of the conductive sheet 60 accompanying the conveyance of the sheet 55 is prevented.

The conductive sheet 60 according to the first embodiment described above uses the fixed seal to regulate the relative position with respect to the sheet tray 13. On the other hand, the conductive sheet 60 according to the second to fourth embodiments does not use the fixed seal Therefore, the sheet bundle package 50 according to the second to fourth embodiments does not include the seal mount 79 as an inclusion.

As described above, the double conveyance prevention structure according to the fourth embodiment is a region for forming the engage portion that engages with the tray window portion 14 formed on the sheet tray 13.

Even if the sheet 55 is conveyed from the sheet tray 13, the engage portion engages with the tray window portion 14, so that the relative movement between the conductive sheet 60 and the sheet tray 13 is regulated. Therefore, the double conveyance of the conductive sheet 60 accompanying the conveyance of the sheet 55 is prevented.

According to the above-described embodiments, the conductive sheet 60 is provided on the sheet tray of the paper feed cassettes 11a, 11b of the sheet placing portion 11. On the other hand, the conductive sheet 60 may be provided on the manual feed tray (sheet tray) 11c of the sheet placing portion 11.

The image forming device 10 according to the embodiment is a type of image processing device. On the other hand, the image processing device may be a decolorable device. The decolorable device performs a process of decoloring (erasing) the image formed on the sheet by a decolorable toner.

According to at least one of the embodiments described above, since the conductive region C overlapping the wireless tag 57 of the sheet 55 is formed, the erroneous reading and writing for the wireless tag 57 can be prevented. Since the double conveyance prevention structure is provided, the double conveyance of the conductive sheet 60 accompanying the conveyance of the sheet 55 can be prevented.

While several embodiments have been described, these embodiments have been presented by way of example and are not intended to limit the scope of the disclosure. Further, the concepts from the first embodiment, the second embodiment, the third embodiment, and the fourth embodiment may be combined. These embodiments can be implemented in other various forms, and various omissions, replacements, and changes can be made without departing from the spirit of the disclosure. The accompanying claims and these equivalents are intended to cover such forms or modifications as would fall within the scope and spirit of the disclosure.

What is claimed is:

1. A conductive sheet that is configured to be stacked between a sheet tray of an image forming device and a sheet, the conductive sheet comprising:
   a base layer comprising a conductive material, the base layer configured to be stacked between the sheet tray and the sheet so that the conductive material overlaps with a wireless tag of the sheet; and
   a regulator configured to regulate conveyance of the conductive sheet by the image forming device when the conductive sheet is stacked between the sheet tray and the sheet so that the conductive material overlaps with the wireless tag of the sheet.

2. The conductive sheet according to claim 1, wherein the regulator includes an adhesive.

3. The conductive sheet according to claim 1, wherein the regulator includes a notch to prevent interference with the sheet tray.

4. The conductive sheet according to claim 1, wherein the regulator comprises a material that has a high coefficient of friction with the sheet tray.

5. The conductive sheet according to claim 1, wherein the regulator is magnetic or provides a magnetic force to attract the sheet tray.

6. The conductive sheet according to claim 1, wherein the regulator includes a concave-convex portion configured to prevent adsorption between the conductive sheet and the sheet.

7. The conductive sheet according to claim 1, wherein the regulator includes a window that penetrates through the base layer.

8. The conductive sheet according to claim 7, wherein the window is configured to receive a portion of the sheet tray.

9. The conductive sheet according to claim 1, wherein the regulator includes a bent or bendable portion configured to engage with the sheet tray.

10. The conductive sheet according to claim 1, wherein the base layer is manufactured from a resin material and the conductive material includes aluminum.

11. The conductive sheet according to claim 1, wherein the base layer is manufactured from the conductive material.

12. The conductive sheet according to claim 1, wherein the base layer include a first side and a second side, the first side is configured to engage with the sheet and the second side is configured to engage with the sheet tray, wherein the regulator includes at least one of (a) an adsorption prevention coating disposed along the first side, (b) a high friction coating or layer disposed along the second side, (c) adhesive disposed along the second side, (d) a detachable seal that is configured to selectively couple along an edge of the base layer, (e) a retaining aperture defined by the base layer that is configured to engage with a retainer of the sheet tray, or (f) a tab defined by the base layer that is configured to be manually bent by a user to engage with a tray window defined by the sheet tray.

13. The conductive sheet according to claim 1, wherein the base layer defines a window or notch positioned to align with a tray window of the sheet tray.

14. A sheet bundle package comprising:
- a sheet bundle including a plurality of stacked sheets, each of the plurality of stacked sheets including a wireless tag;
- a conductive sheet including a base layer comprising a conductive material, the base layer configured to be stacked between a sheet tray of an image forming device and the plurality of stacked sheets so that the conductive material overlaps with the wireless tag of each of the plurality of stacked sheets;
- a regulator configured to regulate conveyance of the conductive sheet by the image forming device when the conductive sheet is stacked between the sheet tray and the plurality of stacked sheets; and
- a package material co-packing the sheet bundle, the conductive sheet, and the regulator.

15. The sheet bundle package according to claim 14, further comprising a seal mount including a plurality of mounting seals detachably coupled thereto, wherein the package material co-packs the sheet bundle, the conductive sheet, and the seal mount, and wherein a respective one of the plurality of mounting seals is detachable from the seal mount and configured to be applied to the base layer to function as the regulator.

16. The sheet bundle package according to claim 14, wherein the base layer include a first side and a second side, the first side is configured to engage with a respective sheet of the plurality of stacked sheets and the second side is configured to engage with the sheet tray, wherein the regulator includes at least one of (a) an adsorption prevention coating disposed along the first side, (b) a high friction coating or layer disposed along the second side, (c) adhesive disposed along the second side, (d) a detachable seal that is configured to selectively couple along an edge of the base layer, (e) a retaining aperture defined by the base layer that is configured to engage with a retainer of the sheet tray, or (f) a tab defined by the base layer that is configured to be manually bent by a user to engage with a tray window defined by the sheet tray.

17. The sheet bundle package according to claim 14, wherein the base layer defines a window or notch positioned to align with a tray window of the sheet tray.

18. The sheet bundle package according to claim 14, wherein the base layer is manufactured from a resin material, or wherein the base layer is manufactured from the conductive material.

19. A conductive sheet comprising:
- a base layer configured to be stacked between a sheet tray of an image forming device and a sheet, wherein at least a portion of the base layer includes a conductive material positioned to overlap with a wireless tag of the sheet; and
- a regulator configured to regulate conveyance of the base layer by the image forming device when the conductive sheet is stacked between the sheet tray and the sheet.

20. The conductive sheet according to claim 19, wherein the base layer include a first side and a second side, the first side is configured to engage with the sheet and the second side is configured to engage with the sheet tray, wherein the regulator includes at least one of (a) an adsorption prevention coating disposed along the first side, (b) a high friction coating or layer disposed along the second side, (c) adhesive disposed along the second side, (d) a detachable seal that is configured to selectively couple along an edge of the base layer, (e) a retaining aperture defined by the base layer that is configured to engage with a retainer of the sheet tray, or (f) a tab defined by the base layer that is configured to be manually bent by a user to engage with a tray window defined by the sheet tray.

\* \* \* \* \*